United States Patent [19]

Chen et al.

[11] 4,093,604

[45] June 6, 1978

[54] COPOLYMERS OF POLYPARABANIC ACIDS AND POLYAMIDES

[75] Inventors: Augustin T. Chen, Cheshire; Kemal B. Onder, North Haven, both of Conn.

[73] Assignee: The Upjohn Company, Kalamazoo, Mich.

[21] Appl. No.: 812,800

[22] Filed: Jul. 5, 1977

[51] Int. Cl.$^2$ ............................................. C08G 18/00
[52] U.S. Cl. ..................... 260/77.5 CH; 260/77.5 R; 260/77.5 C
[58] Field of Search .................. 260/77.5 CH, 77.5 C, 260/77.5 R

[56] References Cited

U.S. PATENT DOCUMENTS

| | | | |
|---|---|---|---|
| 3,661,859 | 5/1972 | Patton | 260/77.5 CH |
| 3,684,773 | 8/1972 | Patton | 260/77.5 CH |
| 3,734,896 | 5/1973 | Patton | 260/77.5 CH |
| 3,936,584 | 2/1976 | Patton | 260/77.5 R |
| 3,969,290 | 7/1976 | Kraft et al. | 260/77.5 CH |

*Primary Examiner*—M. J. Welsh
*Attorney, Agent, or Firm*—Denis A. Firth; John Kekich

[57] ABSTRACT

Random copolymers of polyparabanic acids and polyamides are described. The copolymers are highly useful engineering thermoplastics which, unlike the corresponding polyparabanic acids alone, are readily moldable by extrusion, injection molding and like techniques. The copolymers are readily prepared by a one-shot reaction of (i) bis(alkoxyoxalyl)amides of aliphatic, araliphatic or aromatic diamines, (ii) aromatic or aliphatic dicarboxylic acids, and (iii) organic diisocyanates.

7 Claims, No Drawings

COPOLYMERS OF POLYPARABANIC ACIDS AND POLYAMIDES

BACKGROUND OF THE INVENTION

1. Field of the Invention

This invention relates to heterocyclic polymers and to methods for their preparation and is more particularly concerned with copolymers of polyparabanic acids and polyamides and with methods for their preparation.

2. Description of the Prior Art

Polyparabanic acids are known in the art; see, for example, U.S. Pat. Nos. 3,609,113 and 3,661,859. These polymers possess excellent thermal stability but, because of their high melting points, are not susceptible of being molded readily by conventional techniques such as compression molding, extrusion and the like. Accordingly, their use has been limited to formation of films by casting from solution and to incorporation in coating compositions for wire coating and like applications.

Certain copolymers of polyparabanic acids with other polymers have been described. German Offenlegungsschrift 2,404,741 shows the preparation of copolymers which contain parabanic acid and hydantoin moieties. However, these copolymers possess melt characteristics of the same order as the polyparabanic acids themselves and are not capable of being molded by conventional techniques other than casting from solution.

German Offenlegungsschrift 2,450,035 shows the preparation of copolymers of parabanic acid and imides but, again, the melt characteristics are such that molding by conventional techniques is not possible.

We have now found that certain copolymers which contain the parabanic acid moiety possess excellent melt characteristics which permit the copolymers to be extruded, injection molded, compression molded and the like. These copolymers also possess the excellent thermal stability and structural strength properties of the polyparabanic acids themselves.

SUMMARY OF THE INVENTION

This invention comprises copolymers characterized by the presence in random arrangement of each of the following recurring units:

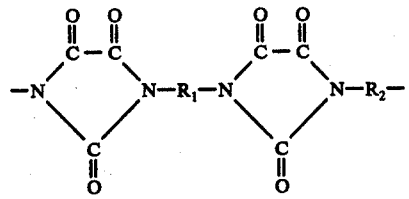

and

wherein $R_1$ represents a member selected from the group consisting of alkylene from 1 to 15 carbon atoms, inclusive, arylene from 6 to 12 carbon atoms, inclusive, and aralkylene from 7 to 25 carbon atoms, inclusive; $R_2$ is the residue of an organic diisocyanate $R_2$—(NCO)$_2$; and $R_3$ is alkylene from 4 to 13 carbon atoms, inclusive, with the proviso that when $R_1$ represents arylene, $R_3$ is free of aromaticity.

The invention also comprises processes for the preparation of the above-described copolymers.

The term "alkylene from 1 to 15 carbon atoms, inclusive" means both straight and branched-chain alkylene having the stated carbon atom content. Illustrative of alkylene are methylene, ethylene, 1,2-propylene, 1,3-propylene, 1,4-butylene, 1,6-hexylene, 2-methyl-1,6-hexylene, 2,2,4-trimethylhexylene, 2,4,4-trimethylhexylene, 4,4'-methylene(cyclohexylene), 3-methylene-3,5,5-trimethylcyclohexylene

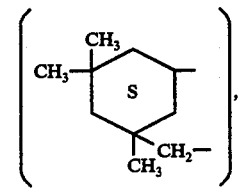

2,2'-propanebis(4-cyclohexylene)

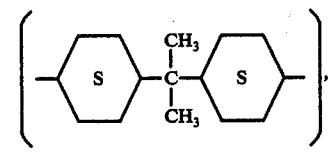

and the like.

The term "arylene from 6 to 12 carbon atoms, inclusive" means the divalent radical obtained by removing two nuclear hydrogen atoms from an aromatic hydrocarbon having the stated carbon atom content. Illustrative of arylene are phenylene, naphthylene, biphenylene and the like.

The term "aralkylene from 7 to 25 carbon atoms, inclusive" means the divalent radical obtained by removing two hydrogen atoms from an alkyl-substituted aromatic hydrocarbon of the stated carbon atom content. Illustrative of aralkylene are tolylene, xylylene, phenylenemethylene

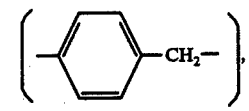

bis(phenylene)methylene

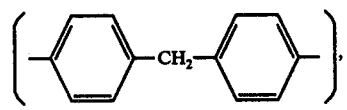

2-naphthylenemethylene

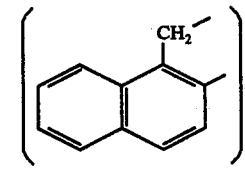

2,2'-propanebis(4-phenylene)

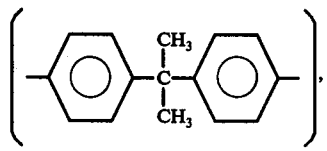

dicyclohexyldi(4-phenylene) methane

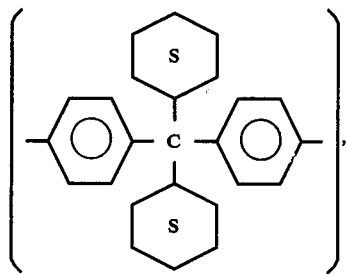

and the like.

The term "alkylene from 4 to 13 carbon atoms, inclusive" means alkylene as above defined except for the difference in carbon atom content. Illustrative of alkylene having a carbon atom content of 4 to 13 are 1,4-butylene, 1,6-hexylene, 1,7-heptylene, 1,8-octylene, 2,3-dimethyl-1,2-octylene, 3,4-dibutyl-1,5-pentylene, 3-methylene-3,5,5-trimethylcyclohexylene, 2,2,4-trimethylhexamethylene, 2,4,4-trimethylhexamethylene, and the like.

DETAILED DESCRIPTION OF THE INVENTION

The copolymers of the invention are prepared by bringing together, in a one-shot reaction, the appropriate dicarboxylic acid $HOOC-R_3-COOH$ (III) wherein $R_3$ is as hereinbefore defined, the appropriate diisocyanate $R_2(NCO)_2$ (IV) wherein $R_2$ is as hereinbefore defined, and the appropriate bis(alkoxyoxalyl)amide of the formula:

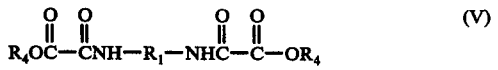

wherein $R_1$ is as above defined and $R_4$ represents lower-alkyl, i.e., alkyl from 1 to 6 carbon atoms such as methyl, ethyl, propyl, butyl, pentyl, hexyl and isomeric forms thereof.

The reactants are brought together, advantageously in the presence of an inert polar organic solvent, and heated at a temperature in the range of about 150° C to about 200° C. The progress of the reaction can be followed by routine analytical procedures; for example, aliquots of the reaction mixture are removed at appropriate intervals and subjected to infrared analysis to determine the point at which the absorption bands characteristic of the isocyanate group have disappeared. When the reaction is adjudged complete by such methods, the desired copolymer is isolated from the reaction product by conventional procedures. For example, the total reaction product is poured into water or like fluid in which the copolymer is insoluble. The precipitated polymer is then comminuted, washed with solvent in which the starting monomers are soluble, and dried.

The proportions in which the diamide (V), the diisocyanate (IV) and the dicarboxylic acid (III) are employed can vary over a wide range provided that the ratio of moles of the diisocyanate (IV) to the sum of the moles of diamide (V) and dicarboxylic acid (III) employed in the reaction is substantially unity. Subject to this proviso, the molar proportion of diamide (V) to dicarboxylic acid (III) can vary within the range of about 70%:30% to about 20%:80%. This proportion will, of course, affect the proportion of the parabanic acid units (I) to amide units (II) in the resulting copolymer.

The reactions which take place in the above-described copolymerization are:

(i) the formation of parabanic acid units (I) by reaction between the diisocyanate (IV) and the diamide (V):

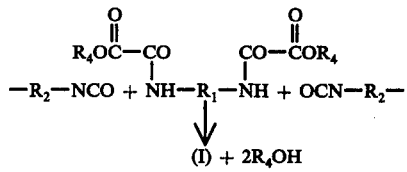

and (ii) the formation of polyamide units (II) by reaction between the diisocyanate (IV) and the dicarboxylic acid unit (III)

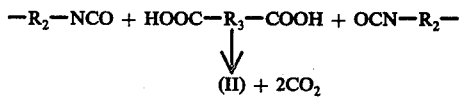

The above reactions are advantageously catalyzed by inclusion in the reaction mixture of a catalyst for the amide-forming reaction between isocyanates and carboxylic acids. Any of the catalysts known in the art for this purpose can be employed such as the alkali metal alkoxides (as described in U.S. Pat. No. 4,001,186), the N-alkali metal lactamates (as described in U.S. Pat. No. 4,021,412), the phospholene-1-oxides or 1-sulfides (described in U.S. Pat. Nos. 2,663,737–2,663,738) and the phospholane-1-oxides or 1-sulfides (described in U.S. Pat. No. 2,663,739). A particularly preferred group of catalysts comprises 1,3-dimethyl-2-phospholene-1-oxide, 1,3-dimethyl-3-phospholene-1-oxide and mixtures of these two isomers.

The above catalysts are generally employed in amounts corresponding to about 0.001 percent to about 0.5 percent by weight of total reactants and preferably in amounts corresponding to about 0.02 percent to about 0.2 percent by weight of total reactants.

By "inert polar organic solvent" is meant any of the polar organic solvents known in the art which do not enter into reaction with one or more of the reactants or interfere in any other way with the desired course of the process of the invention. Illustrative of inert polar organic solvents are N-methylpyrrolidone, dimethylformamide, dimethylacetamide, dimethylsulfoxide, hexamethylphosphoramide, tetramethylenesulfone, α-butyrolactone, glutaronitrile, o-dichlorobenzene, and mixtures of two or more such solvents.

The diamides (V) which are employed as starting materials for the copolymers of the invention are readily obtained by heating the appropriate diamine $H_2N-R_1-NH_2$, where $R_1$ is as hereinbefore defined with an excess of dialkyl oxalate under the conditions described by Klinger, Annalen 184, p. 263, 1877. Illustrative of the diamines which are employed as starting materials for the diamides (V) are 4,4'-methylenebis(aniline), 4,4'-methylenebis(cyclohexylamine), hexamethylenediamine, octamethylenediamine, butylenediamine, ethylenediamine, 1,12-dodecandiamine, 1,4-phenylenediamine, 4,4'-biphenylenediamine, 2,4-toluenediamine, 2,6-toluenediamine, and the like.

The organic diisocyanates employed in preparing the copolymers of the invention can be any of those known in the art. Illustrative of organic diisocyanates are 2,4-toluene diisocyanate, 2,6-toluene diisocyanate, 4,4'-methylenebis(phenyl isocyanate), 2,4'-methylenebis(phenyl isocyanate), dianisidine diisocyanate, tolidine diisocyanate, hexamethylene diisocyanate, m-xylylene diisocyanate, 1,5-naphthalene diisocyanate, p-phenylene diisocyanate, 1,4-diethylbenzene-β,β'-diisocyanate, di-(p-isocyanatocyclohexyl)-methane, 2,2-di(4'-isocyanatophenyl)propane, 2,2-di[p-(4-isocyanatophenoxy)phenyl]propane, and the like. Mixtures of two or more such diisocyanates can be employed if desired.

Illustrative of the dicarboxylic acids (III) which are employed in preparing the copolymers of the invention are adipic, azelaic, sebacic, undecandioic acid, dodecanioic acid, tridecandioic acid and the like.

It has been found that, in the case where the group $R_1$ in recurring unit (I) is non-aromatic, i.e., represents alkylene as hereinbefore defined, it is possible to replace up to 25 molar percent of the acid (III) with an aromatic dicarboxylic acid such as isophthalic, terephthalic and the like, including mixtures of two or more such acids, without detracting from the desirable molding characteristics and other physical properties of the copolymers of the invention.

The polymers obtained in accordance with the invention are random copolymers characterized by the presence of each of the recurring units (I) and (II) in random order. In contrast to the corresponding polyparabanic acid homopolymers, which have too high a melting point to be molded satisfactorily by conventional techniques, the copolymers of the invention possess excellent melt characteristics and can be molded by extrusion, injection molding, compression molding and like techniques. Thus, the copolymers of the invention are engineering plastics which can be formed, i.e., molded, into a variety of articles such as seals, bearings, fibers, gaskets, and the like.

The following examples describe the manner and process of making and using the invention and set forth the best mode contemplated by the inventors of carrying out the invention but are not to be construed as limiting.

EXAMPLE 1

A. Diethyl 4,4'-methylenedioxanilate

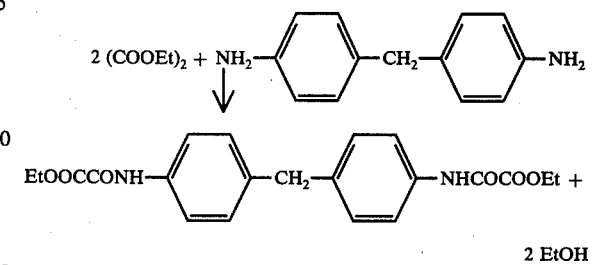

A mixture of 118.8 g. (0.6 mole) of 4,4'-diaminophenylmethane and 600 g. (4.11 mole) of diethyl oxalate was heated at 150° C with stirring under an atmosphere of nitrogen. Ethanol distilled out of the reaction mixture until, at the end of six hours' heating, the theoretical quantity of ethanol had been collected. At this time the reaction mixture was cooled to circa 20° C and the solid which separated was isolated by filtration, washed with cold ethanol and dried in vacuo at 100° C for 7 hours. The solid so obtained was recrystallized from 95% ethanol to yield diethyl 4,4'-methylenedioxanilate in the form of white needles having a melting point of 146° – 147° C.

B. Copolymer of parabanic acid and amide

A mixture of 11.94 g. (0.03 mole) of diethyl 4,4'-methylenedioxanilate (prepared as described above) and 5.64 g. (0.03 mole) of azelaic acid was dissolved in 50 ml. of dry tetramethylene sulfone and the solution so obtained was heated to 200° C under an atmosphere of nitrogen. To the hot mixture was added, with stirring, 0.1 g. of 1,3-dimethylphospholene-1-oxide followed by the dropwise addition of 15 g. (0.06 mole) of 4,4'-methylenebis(phenyl isocyanate) in 40 ml. of tetramethylenesulfone. After the addition was complete, the solution was heated, with stirring, at 200° C until a total of 6 hours had elapsed. The viscous solution so obtained was cooled to circa 20° C and poured into a large excess of water. The light yellow polymer which precipitated was chopped into small pieces, isolated by decanting away the supernatant solvent, and washed by stirring in methanol for six hours. The washed solid was isolated by filtration and dried in vacuo at 180° C for 16 hours. The resulting polymer was found to have an intrinsic viscosity (0.5% w/w in N-methylpyrrolidone) of 0.69. The polymer was characterized by approximately equimolar proportions of recurring units of the formulae:

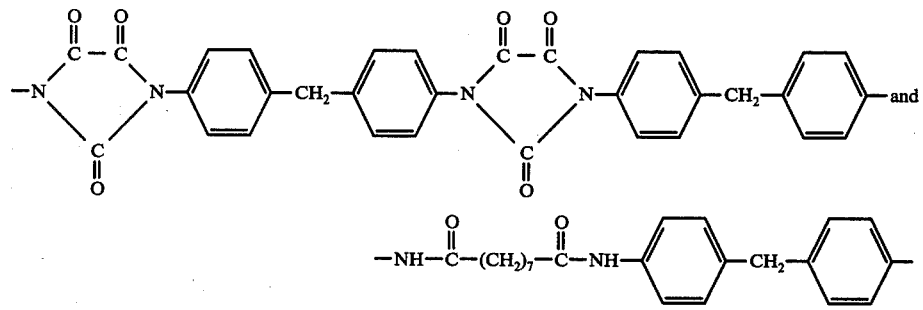

A sample of the polymer was compression molded at 250° C under 4,000 psi pressure to give a translucent sheet. The polymer was subjected to a Gehman Torsional Stiffness Test and found to have a glass transition temperature (Tg) of 190° C. The polymer was demonstrated to be injection moldable by its behaviour in the Monsanto Capillary Extrusion Rheometer [see Encyclopedia of Polymer Science and Technology 8, 609, John Wiley and sons, New York, 1968]. The polymer was extruded readily in the latter instrument at 240° C.

EXAMPLE 2

A mixture of 11.94 g. (0.03 mole) of diethyl 4,4'-methylenedioxanilate (prepared as described in Example 1, Part A) and 5.64 g. (0.03 mole) of azelaic acid was dissolved in 50 ml. of anhydrous tetramethylenesulfone. The solution so obtained was heated, with stirring, to 200° C under an atmosphere of nitrogen and 0.12 g. of 1,3-dimethylpholene-1-oxide was added followed, dropwise, by a mixture of 9.75 g. (0.039 mole) of 4,4'-methylenebis(phenyl isocyanate) and 3.65 g. (0.021 mole) of 2,4-toluene diisocyanate in 50 ml. of anhydrous tetramethylenesulfone. The mixture gradually became viscous during the addition and, after 90% of the isocyanate mixture had been added, it was necessary to add 40 ml. of anhydrous tetramethylenesulfone to dilute the reaction mixture before completing addition of the remainder of the isocyanate mixture. After the addition of the isocyanate mixture was complete (3 hours) the reaction mixture was stirred and heated at 200° C for a further 2 hours before being cooled and poured into a large excess of water. The yellow polymer which separated was chopped into small pieces, isolated by decantation, and washed by stirring in methanol for 6 hours. The washed product was isolated by filtration and dried in vacuo at 180° C for 16 hours. The polymer was found to have an intrinsic viscosity (0.5% w/w in N-methylpyrrolidone) of 0.64 and was characterized by approximately equimolar proportions of recurring units of the formulae:

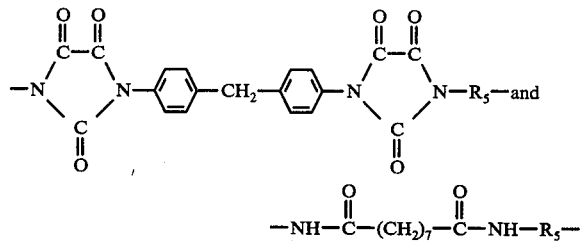

wherein $R_5$, in 65% of said recurring units represents

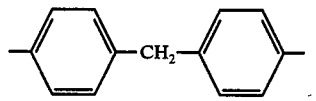

and, in the remaining 35% of said recurring units, represents

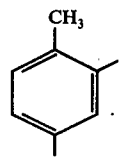

A sample of the polymer was compression molded at 250° C under 4000 psi pressure to give a translucent sheet. The polymer was subjected to a Gehman Torsional Stiffness Test and found to have a glass transition temperature (Tg) of 179° C.

EXAMPLE 3

Using the procedure described in Example 1, but replacing the diethyl 4,4'-methylenedioxanilate there used by an equivalent amount of N,N'-di(ethoxyoxalyl)-hexamethylenediamine (prepared from diethyloxalate and hexamethylenediamine using the procedure described in Example 1, part A), there is obtained the corresponding poly(parabanic acid-amide) characterized by approximately equimolar proportions of recurring units of the formula:

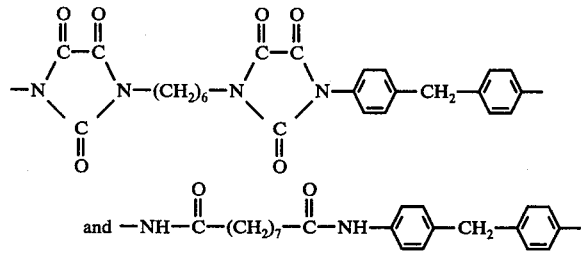

Similarly, using the procedure described in Example 1, but replacing the diethyl 4,4'-methylenedioxanilate there used by an equivalent amount of N,N'-di(ethoxyoxalyl)-1,4-phenylenediamine, N,N'-di(ethoxyoxalyl)-4,4'-biphenylenediamine, or N,N'-di(ethoxyoxalyl)-1,10-decanediamine, there are obtained the corresponding poly(parabanic acid-amides) having approximately equimolar proportions of the recurring units of formulae (I) and (II) wherein $R_1$ is 1,4-phenylene, 4,4'-biphenylene, and 1,10-decamethylene, respectively, $R_2$ is

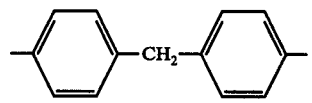

and $R_3$ is —$(CH_2)_7$—.

EXAMPLE 4

Using the procedure described in Example 1, but replacing the 4,4'-methylenebis(phenyl isocyanate) there used by an equivalent amount of 4,4'-methylenebis(cyclohexyl isocyanate), there is obtained a poly(parabanic acid-amide) characterized by approximately equimolar proportions of recurring units of the formulae:

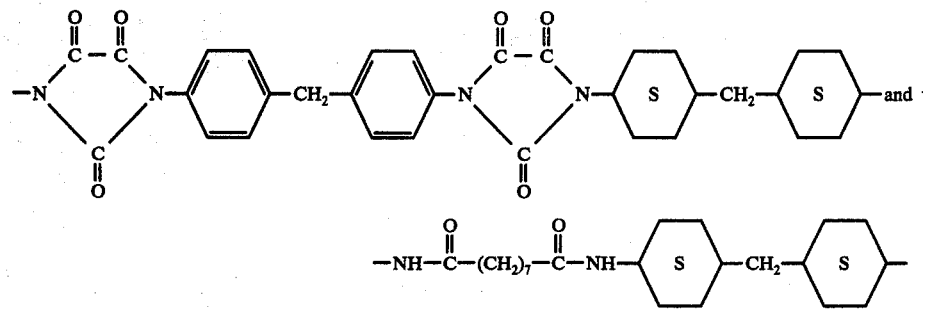

EXAMPLE 5

Using the procedure described in Example 1, but replacing the diethyl 4,4'-methylenedioxanilate there used by an equivalent amount of N,N'-di(ethoxyoxalyl) 4,4'-methylenebis(cyclohexylamine), there is obtained the corresponding poly(parabanic acid-amide) having approximately equimolar proportions of the recurring units of formulae (I) and (II) wherein $R_1$ is

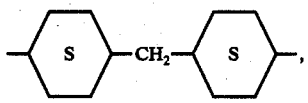

$R_2$ is

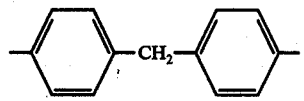

and $R_3$ is $-(CH_2)_7-$.

EXAMPLE 6

Using the procedure described in Example 1, but replacing the azelaic acid there used by an equivalent amount of adipic, sebacic, or undecan-1,11-dioic acids there are obtained the corresponding poly(parabanic acidamides) having approximately equimolar proportions of the recurring units of formulae (I) and (II) wherein $R_3$ is $-(CH_2)_4-$, $-(CH_2)_8-$ and $-(CH_2)_{11}-$, respectively, and $R_1$ and $R_2$ represent

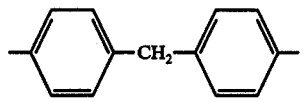

in all instances.

We claim:

1. A copolymer characterized by the presence in random arrangement of each of the following recurring units:

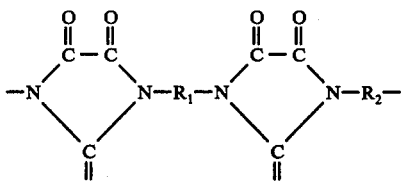

and

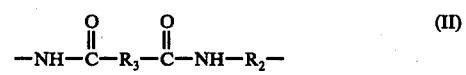

wherein $R_1$ represents a member selected from the group consisting of alkylene from 1 to 15 carbon atoms, inclusive, arylene from 6 to 12 carbon atoms, inclusive, and aralkylene from 7 to 25 carbon atoms, inclusive, $R_2$ is the residue of an organic diisocyanate $R_2-(NCO)_2$, and, in 75 to 100 percent of the units (II), $R_3$ is alkylene from 4 to 13 carbon atoms, inclusive, and, in 0 to 25 percent of the units (II), $R_3$ is arylene from 6 to 12 carbon atoms, inclusive, with the proviso that, when $R_1$ represents arylene, $R_3$ is free of aromaticity.

2. A copolymer according to claim 1 wherein $R_2$ represents

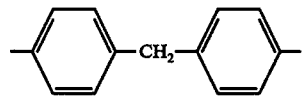

3. A copolymer according to claim 2 wherein $R_1$ also represents

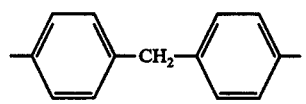

4. A copolymer according to claim 3 wherein $R_3$ represents heptamethylene.

5. A copolymer according to claim 1 wherein $R_2$ represents the residue of a mixture of methylenebis(phenyl isocyanate) and toluene diisocyanate.

6. A copolymer characterized by the presence in random arrangement of each of the following recurring units

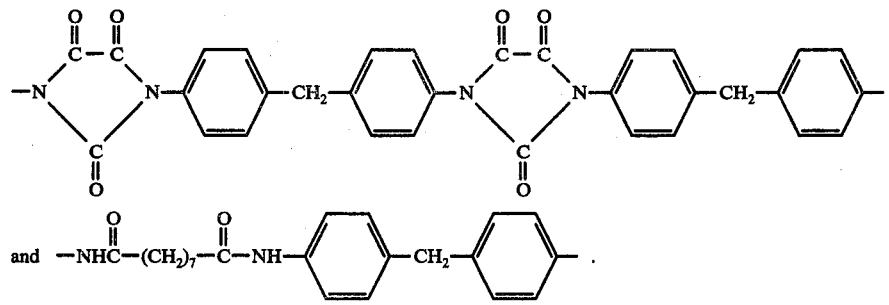
and 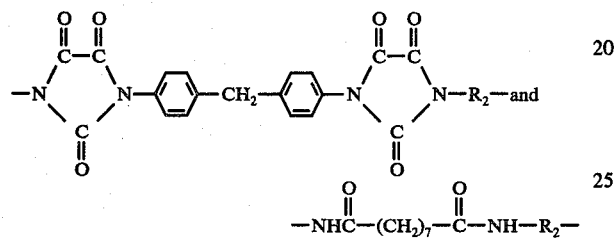
7. A copolymer characterized by the presence in random arrangement of each of the following recurring units
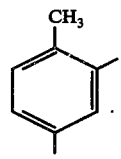
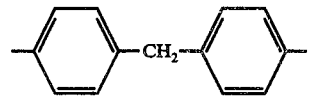
wherein, in approximately 65 percent of said recurring units, R₂ represents
and in the remaining recurring units R₂ represents
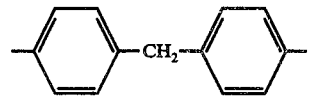
* * * * *